US012672734B2

(12) United States Patent
Abraham et al.

(10) Patent No.: US 12,672,734 B2
(45) Date of Patent: Jul. 7, 2026

(54) BEVERAGE PREPARATION SYSTEM

(71) Applicant: SOCIETE DES PRODUITS NESTLE S.A., Vevey (CH)

(72) Inventors: Sophie Abraham, Remoray (FR); Marilyne Isabelle Bonin, Les Grangettes (FR); Gina Fiore, Ferlens (CH); Stephane Pellegrini, Montperreux (FR)

(73) Assignee: Société des Produits Nestlé S.A., Vevey (CH)

( * ) Notice: Subject to any disclaimer, the term of this patent is extended or adjusted under 35 U.S.C. 154(b) by 379 days.

(21) Appl. No.: 18/007,146

(22) PCT Filed: Jul. 30, 2021

(86) PCT No.: PCT/EP2021/071506
§ 371 (c)(1),
(2) Date: Jan. 27, 2023

(87) PCT Pub. No.: WO2022/023578
PCT Pub. Date: Feb. 3, 2022

(65) Prior Publication Data

US 2023/0337851 A1     Oct. 26, 2023

(30) Foreign Application Priority Data

| Jul. 30, 2020 | (EP) | ..................................... | 20188733 |
| Jul. 30, 2020 | (EP) | ..................................... | 20188738 |
| Jul. 30, 2020 | (EP) | ..................................... | 20188741 |

(51) Int. Cl.
| *A47J 31/40* | (2006.01) |
| *A47J 31/44* | (2006.01) |
(Continued)

(52) U.S. Cl.
CPC ......... *A47J 31/407* (2013.01); *A47J 31/4403* (2013.01); *A47J 31/46* (2013.01); *B65D 75/30* (2013.01); *B65D 85/8052* (2020.05)

(58) Field of Classification Search
None
See application file for complete search history.

(56) References Cited

U.S. PATENT DOCUMENTS

| 2017/0275086 A1 | 9/2017 | Perentes et al. |
| 2017/0275088 A1 | 9/2017 | Ait Bouziad et al. |
(Continued)

FOREIGN PATENT DOCUMENTS

| CL | 2008000658 A1 | 7/2008 |
| CL | 2017000375 A1 | 8/2017 |
(Continued)

OTHER PUBLICATIONS

Chile Office Action for Appl No. 202300222 dated Aug. 27, 2024, 14 pages.

*Primary Examiner* — Tanzim Imam
(74) *Attorney, Agent, or Firm* — Thorpe North & Western, LLP

(57) ABSTRACT

The invention concerns a beverage production system comprising a module (1) for producing a beverage from a pack (10), —said pack comprising a bottom side (101), and said bottom side (101) of said pack comprising an area (104) configured for being openable, said openable area being made of a flexible material, and—a module (1) comprising a pack holder assembly (2), a fluid processing device (11) designed to open the openable area (104)) of the pack, and an actuating device (12) to move said fluid processing device (11) and said pack (10) one to the other, and—the pack holder assembly (2) comprises a movable locking device (24) to position the pack (10) inside the pack chamber (22) when a beverage is prepared, and wherein the bottom (Continued)

part of the pack (10) comprises at least two fixing means (103), said fixing mean being a hole or a deformable area, and wherein the movable locking device (24) comprises at least two positioning means (242), each of said positioning means being configured: to move inside at least one respective hole (103) of the pack hold in the chamber, or, to move inside at least one respective deformable area (103) of the pack hold in the chamber and to fit in the resulting deformed area.

11 Claims, 7 Drawing Sheets

(51) Int. Cl.
    *A47J 31/46*         (2006.01)
    *B65D 75/30*       (2006.01)
    *B65D 85/804*     (2006.01)

(56) References Cited

U.S. PATENT DOCUMENTS

| | | |
|---|---|---|
| 2017/0275089 A1 | 9/2017 | Perentes et al. |
| 2017/0275090 A1 | 9/2017 | Dubesset et al. |
| 2017/0347831 A1 | 12/2017 | Perentes et al. |
| 2019/0167030 A1 | 6/2019 | Jarisch et al. |
| 2021/0188530 A1 | 6/2021 | Pellegrini et al. |

FOREIGN PATENT DOCUMENTS

| | | | | |
|---|---|---|---|---|
| CL | 2019000401 A1 | 5/2019 | | |
| CN | 111278336 A | 6/2020 | | |
| JP | 2006515764 | 6/2006 | | |
| JP | 2017531524 | 10/2017 | | |
| RU | 2015139686 | 3/2017 | | |
| WO | 2012110323 A1 | 8/2012 | | |
| WO | 2016071156 | 5/2016 | | |
| WO | 2017121796 A1 | 7/2017 | | |
| WO | 2018007383 | 1/2018 | | |
| WO | 2019096830 | 5/2019 | | |
| WO | WO-2019096830 A1 * | 5/2019 | .......... | A47J 31/3676 |

* cited by examiner

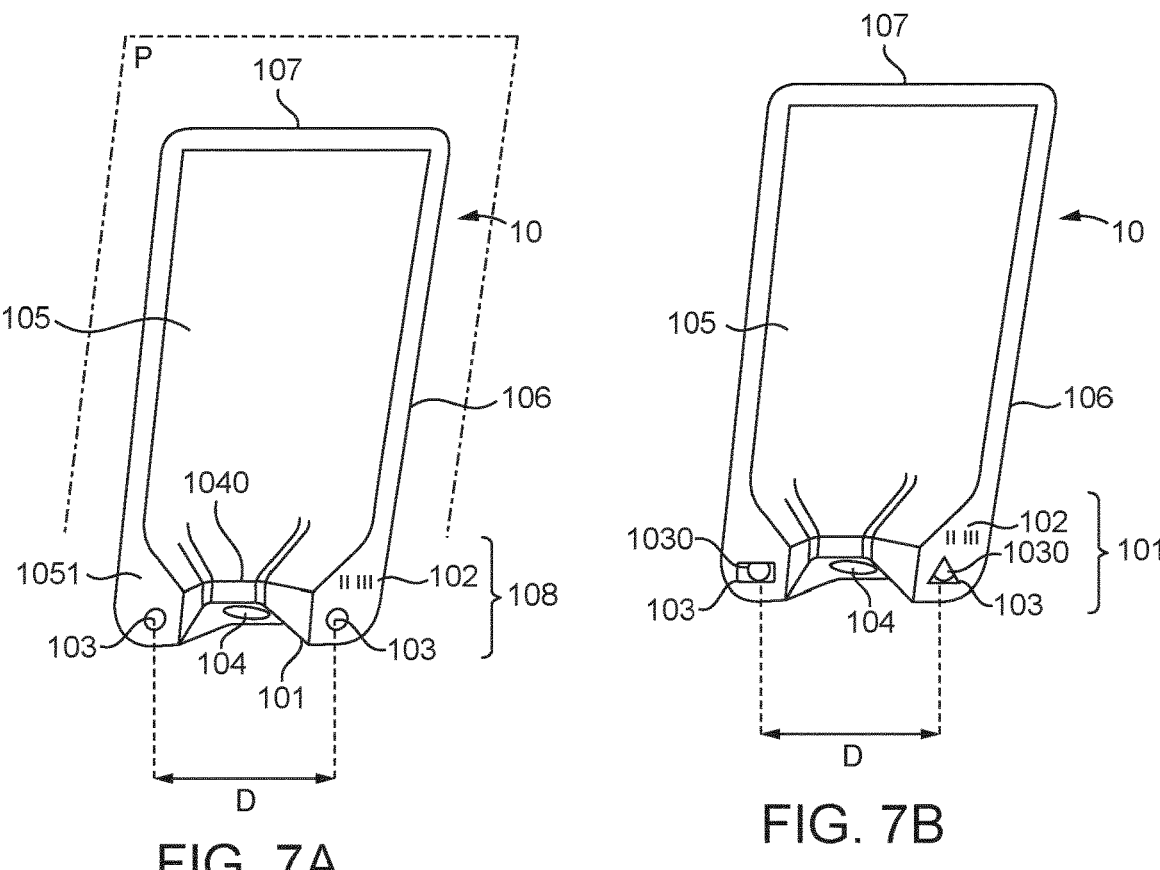
FIG. 7A
FIG. 7B
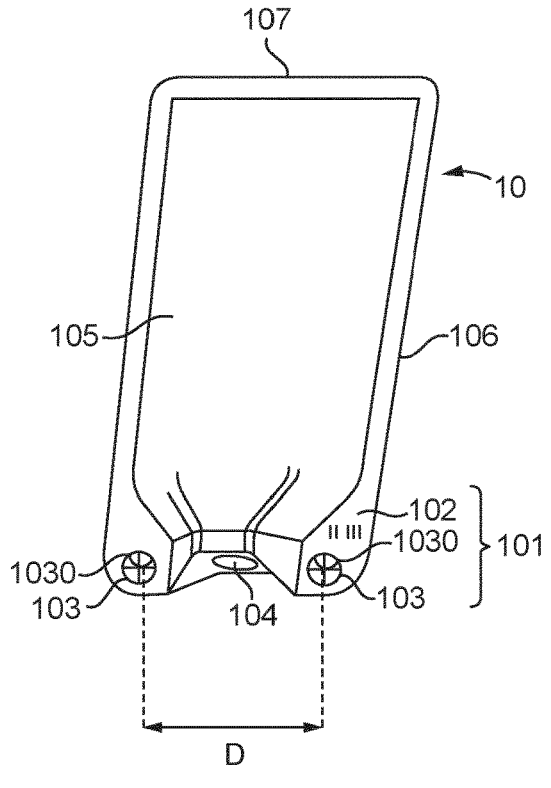
FIG. 7C

BEVERAGE PREPARATION SYSTEM

CROSS REFERENCE TO RELATED APPLICATIONS

The present application is a National Stage of International Application No. PCT/EP2021/071506, filed on Jul. 30, 2021, which claims priority to European Patent Application No. 20188741.1, filed on Jul. 30, 2020, European Patent Application No. 20188733.8, filed on Jul. 30, 2020, and European Patent Application No. 20188738.7, filed on Jul. 30, 2020, the entire contents of which are being incorporated herein by reference.

FIELD OF THE INVENTION

The present invention relates to a beverage system using packs of beverage ingredient.

BACKGROUND OF THE INVENTION

WO2021110652 describes a beverage preparation machine for the preparation of beverages from containers holding beverage ingredients. The system machine a specific water injection needle designed to pierce the bottom of a container introduced inside the machine, to introduced water therein through its water inlet and to dispense the beverage resulting from the mixing of the ingredient and water though a specific dispensing outlet of this needle. Two different relative positions of the needle and the container enable either the introduction of water or the dispensing of beverage.

This system machine requires a perfect position of the container relatively to the water injection needle during the different steps of the beverage preparation. Non correct alignment either vertically or centrally would lead to leaks (of water or of beverage), incorrect preparation of the beverage (not enough water introduced in the container) and dirtiness due to leaks. The relative position of this fluid processing device inside the container is critical to obtain a correct preparation of the beverage. In particular, if this device does not correctly pierce the bottom of the container, there is a risk that the device does not enter sufficiently inside the volume of the container. In that situation, the introduction of fluid through the fluid processing device and inside the container leads to a leak of water below the device meaning imperfect preparation of the beverage. Water or imperfect beverage can squirt in the area around the needle and create dirtiness, in particular if a code reader is present, this reader can be dirtied with the result that the code reading is not possible. Frequent cleaning is required which is not acceptable.

If the needle is provided with an inlet for air to foam the beverage, this inlet can be obstructed because its size is quire small and optimal beverage preparation cannot be obtained. These problems are even emphasized when the container is essentially made of flexible material.

Due to the flexible property of the material and eventually depending on its stretchable property which may result from the nature of the material, it has been observed that the piercing of the bottom of the container can be difficult because the bottom of the container moves or deforms under the force of the fluid processing device.

In addition, it has been observed that, even if the fluid processing device enters correctly at the bottom of the container, the force of the jet of water squirting out of the inlet of the device can be so strong that this force impinges on the internal walls of the container and can push and move the container upwardly. This is particularly true for a flexible container because under the effect of an upwardly force, its upper part is able to fold itself along the top wall of the container holder. This upward movement of the container directly impacts the connection between the fluid processing device and the bottom of the container, which creates fluid leaks or the dispensing of the beverage too early in the process of preparation of the beverage. In addition, if the container folds, the beverage cannot be prepared correctly, for example some soluble ingredient may not be dissolved.

There is a need to guarantee an efficient piercing and efficient beverage preparation.

An object of the invention is to address the above existing problems.

SUMMARY OF THE INVENTION

In a first aspect of the invention, there is provided a beverage production system comprising a module for producing a beverage from a pack, said pack comprising a beverage ingredient, said ingredient being configured to be mixed with a fluid to produce a beverage, said pack presenting a plane shape oriented along a plane (P), said pack comprising a bottom side and said bottom side of said pack comprising an openable area, said openable area being made of a flexible material, and said module comprising:

a pack holder assembly adapted for receiving and holding said pack, said pack holder assembly comprising a pack chamber adapted for receiving said pack through an upper pack inlet and for holding said pack in an essentially vertical position inside the module, said chamber presenting a bottom opening configured to enable access to the bottom of said pack hold in the chamber, and a fluid processing device comprising:

at least one inlet for introducing a fluid into said pack for the preparation of a beverage by mixing said fluid with an ingredient contained in said pack, and at least one outlet for dispensing said beverage from said pack, said fluid processing device being designed to open the openable area of the pack, an actuating device to move said fluid processing device and said pack one to the other so that the fluid processing device opens the bottom side of said pack and position said fluid processing device and said pack one to the other in a fluid introduction position, wherein said fluid processing device protrudes inside the internal volume of the pack in order to introduce the fluid, and wherein the pack holder assembly comprises a movable locking device, said movable locking device being configured to position the pack inside the pack chamber when a beverage is prepared, and wherein the bottom part of the pack comprises at least two fixing means, said fixing mean being a hole or a deformable area, said two fixing means being positioned around the openable area of the bottom side of the pack, and wherein the movable locking device comprises at least two positioning means, each of said positioning means being configured:

to move inside at least one respective hole of the pack hold in the chamber, or to move inside at least one respective deformable area of the pack hold in the chamber and to fit in the resulting deformed area.

This system comprises a pack comprising a food or beverage ingredient able to produce a beverage further to mixing with an aqueous fluid, preferably water.

This food or beverage ingredient packed in the package can be a water soluble powder or a soluble concentrate in liquid or semi-liquid form. In that embodiment water dissolves or dilutes the beverage ingredient. The ingredient can be selected within the list of: soups, fruit juices, vegetable juices, bouillons, coffee, chocolate, tea, milk or creamer, smoothies, purees, coulis, creams or any combination thereof. Preferably, the food or beverage ingredient is a soluble pr dilutable food or beverage ingredient selected in the list of:

> instant coffee powder, milk powder, cream powder, instant tea powder, cocoa powder, soup powder, fruit powder or mixture of said powders,
>
> a coffee concentrate, a milk concentrate, a syrup, a fruit or vegetable concentrate, a tea concentrate, a fruit or vegetable puree.

The powders can be agglomerated or sintered. The powders or liquid concentrates can be mixed with solid pieces for example for preparing soups with solid or encapsulated pieces. This food or beverage ingredient packed in the package can also contain a food or beverage ingredient able to be infused like a roast and ground coffee, or tea leaves. In that embodiment water extracts the beverage ingredient.

The pack presents a plane shape oriented along a plane (P) extending between a bottom side and an upper end.

An area of this bottom side is configured for being openable in order to introduce the fluid inside the pack and to dispense the prepared beverage from the pack. Preferably, this area is configured for being openable by piercing, tearing, perforating or puncturing in particular by applying a pointed, acute or sharp device, such as the fluid processing device, to said area. Preferably this area is positioned at the middle of the transversal dimension of the longitudinal shape of the pack.

This openable area is made of a flexible material.

In one preferred embodiment, the openable area is made of a stretchable material. Such a flexible material can be comprised in the list of: polyethylene (PE), polypropylene (PP), polylactide (PLA), polyhydroxyalcanoates (PHA), polybutylene adipate terepthalate (PBAT), polybutylene succinate (PBS), polyvinyl alcohol (PVOH), starch-based polymers, a polymer comprising food-grade oxygen and/or moisture scavengers, or a combination thereof.

Preferably the rest of the pack is made of flexible material too. Such a material provides the advantages of compactness, manufacturing speed (forming, filling, sealing can be performed in a row) and enhanced recycling capabilities depending on the nature of the material used. This flexible material is preferably water impermeable.

Flexible material can be selected in the list of:

fibre-based material, paper material coated on the inner side with a sealant layer to form sealed edges, and preferably with a barrier coating between the paper and the sealant layer. Barrier coating are configured to create a barrier to oxygen, air and humidity. Such a barrier can include a metallisation coating, a silicone oxide coating, an aluminium coating, an atomic layer deposition (ALD) coating, or any combination thereof.

plastic laminates, metallised foils or alufois.

Preferably, the flexible material is chosen from ecologically friendly materials, such as recyclable, biodegradable, industrially compostable or home compostable materials.

In addition, the system comprises a module for producing a beverage. This module comprises a pack holder assembly configured to hold the pack within the module, a fluid processing device configured to introduce fluid in a pack that is present in the pack holder assembly and an actuating device to move the fluid processing device and the pack hold in the module one to the other.

This pack holder assembly comprises a pack chamber adapted for receiving a pack for a beverage preparation inside the module. The pack chamber comprises an upper pack inlet to introduce the new pack and the pack chamber is configured for holding the pack in an essentially vertical position inside the module. This vertical position guarantees the efficient preparation of the beverage and particularly the dispensing of the beverage from the pack so that the less possible liquid remains inside the pack at the end of the extraction and when the pack must be removed from the system to be thrown to the bin.

The pack chamber presents a bottom opening configured to enable an access of a fluid processing device to the bottom of said pack hold in the chamber. This access or passage is particularly designed to enable the upwards movement of the fluid processing device to the bottom of the pack when it is hold inside the chamber.

The fluid processing device comprises at least one inlet for introducing a fluid into the pack and at least one outlet for dispensing beverage from said pack. In addition, this fluid processing device is designed to open the bottom side of the pack, preferably by piercing. Preferably, this fluid processing device presents a pointed part upwardly oriented inside the module. The fluid processing device is configured to cooperate with the bottom of the pack to introduce a fluid in the pack in order to prepare a beverage inside the pack and then to dispense the prepared beverage from the pack. This fluid processing device can be one of the devices described in WO 2021/110650.

This fluid processing device is movable to different positions, said positions comprising at least one position where the device is out of the pack and another position where the device is introduced inside the pack during the beverage preparation.

In addition, the pack holder assembly comprises a movable locking device configured:

in one position, to position the pack inside the pack chamber when a beverage is prepared, and in another position, to release the pack which enables a user to introduce or remove the pack.

This locking device is movable to either cooperate with the pack and position it or to move apart from the pack.

Due to this movable locking device, the pack can be well positioned and fixed inside the pack chamber when the fluid processing device cooperates with the bottom of the pack and when fluid is introduced inside the pack.

In particular, the bottom part of the pack comprises at least two fixing means that can be holes or deformable areas. These two holes or deformable areas are positioned around the openable area at the bottom side of the pack, preferably these holes or deformable areas are positioned symmetrically around the openable area.

And, in order to position the pack hold in the chamber, the movable locking device comprises at least two positioning means, preferably at least two pins. Each of said pins is configured to move and fit in at least one respective hole of the pack or configured to move in at least one respective deformable area of the pack and to fit in the resulting deformable area.

The holes can present any shape such a round, oval, square, etc. . . . as long as one positioning mean of the movable locking device can enter it.

The deformable area can be designed or made from a material such that when a positioning mean, such as a pin, of the movable locking device is pushed against it, it is deformed and the positioning means extends perpendicularly to the plan shape of the pack and fix the bottom of the pack relatively to the module, that is the fixing and positioning function of the pin occurs. The deformation can happen without the material being torn or pierced if the material is sufficiently stretchable. Such deformable area can be also be a slit or two crossed slits, for example in an edge part of the pack.

Preferably, the pack comprises two identical holes or two identical deformable areas, yet the following embodiments are possible too:

a pack with different shapes of holes or dimensions of holes on the different sides of the openable area of the pack bottom side, or a pack with one hole on one side of the openable area of the pack bottom side and with one deformable area on the other side of the openable area of the pack bottom side, a pack with different types of deformable areas on the different sides of the openable area of the pack bottom side.

Preferably, the pack comprises two circular fixing areas, wherein the distance (D) between the centres of said circular fixing areas is at most 52 mm, preferably at most 50 mm, and wherein each of the holes and/or deformable areas of the pack encompasses one of said circular fixing areas.

These fixing areas correspond to zones of the pack that are defined to cooperate with the pins of the movable holder and represent the smallest holes or deformable areas to be present inside the pack so that the pack is fixed and positioned by the positioning means of the movable holder.

Accordingly, the holes or deformable areas can present bigger surfaces than these fixing areas for example due to small variations during manufacturing operation—but, due to the overlap between the holes or deformation areas and the fixing areas, the pack remains well fixed inside the chamber pack when the fluid process device enters inside the openable areas at the bottom side of the pack.

The distance between said circular fixing areas shall not be too important to ensure a limited movement of the pack during introduction of the fluid processing device and then introduction of fluid in the pack. This distance must ensure that the part of the pack around the openable area is hold firmly. In particular, when the bottom of the pack is made of a flexible material, or even a stretchable material, this distance prevents the flexible material from bending around the fluid processing device without obtaining a complete correct opening of the openable area and introduction of the fluid processing device in the pack. That could create gaps or leaks around said device at certain steps of the beverage preparation in particular during the step of fluid introduction.

In the preferred embodiment, the actuating device is configured to move the fluid processing device while the pack is kept fixed by the pins of the movable holder. In that embodiment it is preferred that each of the hole or deformable area of the pack encompasses one circular fixing areas in the lower part of said hole or the lower part of said deformable area respectively. Consequently, the pack is firmly hold by the pins of the movable holder as soon as the fluid processing device exerts an upward pushing force against the openable area at the bottom side of the pack. The fixing is not loose.

In one preferred embodiment, the pack comprises a front wall and a back wall, said front and back walls being made of flexible material, and at least the edges of the bottom parts of said walls are sealed together around the openable area of the bottom side, and the circular fixing areas are provided in said sealed edges, and the distance (D) between the centres of the circular fixing areas is of at least 40 mm, preferably at least 42 mm, even more preferably at least 44 mm.

It has been observed that during the introduction of fluid inside the pack during the beverage preparation, the pack can inflate and the sealed edges can partially separate one from the other. If the circular fixing area is provided in a part of the sealed edge close to the internal volume of the pack, there is an increased risk of detachment of the sealed edges, creating a leak between the internal volume of the sachet and one fixing area. Accordingly, it is preferable to provide the system and the pack with fixing areas which are not too close to the openable area.

The respect of this distance (D) is particularly useful when the openable area of the pack comprises a piece of reinforcing material and the bottom of the pack comprises sealed edges around said piece of material.

Preferably such a piece of reinforcing material is designed to provide a flat surface at the bottom side of the pack.

This piece of reinforcing material is less flexible or more rigid than the flexible material of the opening area. This piece of reinforcing material is also less flexible or more rigid than the walls of the pack when they are flexible.

Preferably this piece of reinforcing material comprises an opening, said opening being closed by a flexible material and forming the openable area. Preferably the size of said opening is a greater than the size of the transversal section of the fluid processing device. Accordingly, the fluid processing device is able to pierce the flexible material at the openable area and to pass through the opening while the pierced flexible material covers a part of the fluid processing device. Preferably, when the opening and the cross section of the fluid processing device present circular shapes, the diameter of the opening is greater than the diameter of the transversal section of the fluid processing device by about 1 mm, said transversal section of the fluid processing device corresponding to the section positioned in the opening when the fluid processing device protrudes inside the internal volume of the pack in order to introduce the fluid.

The piece of reinforcing material can be made of a rigid material or a material that is less flexible than the flexible front and back walls of the pack. For example, the flexible walls can be made of paper or plastic laminate and the reinforcing piece can be made of paper, cardboard, cabasse-based material, bamboo-based material, starch-based material, cellophane or plastic.

When plastic is used preferably the walls and the reinforcing piece are made of the same nature, preferably of a recyclable plastic.

In one first mode, this piece of reinforcing material comprises an opening, said opening being closed by a flexible material, and said flexible material being the same as the rest of the pack. In this mode such a pack with reinforcing piece can be made from a material that is flexible and openable under the force of the fluid processing device. Such a pack can be manufactured by the steps of:

supplying a primary flexible sheet comprising a reinforcing piece at its centre, said reinforcing piece comprising an opening, folding said sheet in two along the area of the reinforcing piece so that the edges of the flexible sheet join together along top side, lateral sides and lateral bottom sides of the pack, sealing the bottom and lateral joined edges, wherein the circular fixing areas are provided in the edges sealed around the reinforcing piece.

Preferably, the above manufacturing operation comprises an additional step of forming the area of the reinforcing piece by placing said area between a plunger and a cavity of conformal shape. This additional step happens before the folding step or simultaneously to the folding step.

In one second mode, the opening in this piece of reinforcing material can be closed by a flexible material, said flexible material being different from the rest of the pack. This mode presents the advantage of applying a stretchable flexible material at the openable area that enables an optimal interaction with the fluid processing device. In particular, after introduction of the fluid processing device, the edges of the pierced stretchable material can conform closely to the surface of the fluid processing device in order to provide tightness and to limit fluid leaks.

Another advantage is that it is possible to choose a flexible material that is easier to open and a lower force is required to open the openable area.

Another advantage is that it is possible to select a material for the openable area with better food grade properties than the material of the rest of the pack.

In this second mode, the bottom side of the pack can comprise:

an external primary sheet of flexible material, said primary sheet comprising a first opening at the openable area, an intermediate secondary sheet of flexible, preferably stretchable material, said secondary sheet covering the first opening, and an internal piece of reinforcing material, said piece comprising a second opening, said second opening facing the first opening.

For a better interaction with the fluid processing device, preferably, the second opening presents a shape that is identical to the shape of the transversal section of the fluid processing device. Generally, this shape is circular.

Preferably, the sizes of the first and second openings are a bit greater than the size of the transversal section of the fluid processing device. Accordingly, the fluid processing device is able to pierce the stretchable material at the openable area and pass through the second opening while the pierced stretchable material covers a part of the fluid processing device. Preferably, when the shapes of the fluid processing device and the second opening are circular, the diameters of the second opening and the transversal section of the fluid processing device can differ by about 1 mm.

Preferably, the size of the first opening is greater than the size of the second opening and the size of the transversal section of the fluid processing device. Accordingly, the fluid processing device does not contact the edges of the first opening during the opening operation. Depending on the nature of the flexible material of the external primary sheet, it can be preferred to limit this contact.

In one preferred embodiment, in the pack of the system, the distance (D) between the centres of the circular fixing areas is comprised between 40 and 52 mm, preferably between 43 and 50 mm, even more preferably between 45 and 49 mm.

Generally, the pack presents a transversal dimension comprised between 60 and 80 mm, preferably comprised between 65 and 75 mm, optimally of about 70 mm. The longitudinal dimension is generally of at least 70 mm and can vary depending on the volume of beverage ingredient to be stored inside.

This range of dimension enables the manufacturing of pack presenting an internal volume sufficient:

to hold a quantity of soluble or dilutable beverage ingredient adapted to the preparation of a beverage drink, and to enable the liquid diluent introduced in the pack to dissolve or dilute efficiently said beverage ingredient, in particular by providing enough place for the mixing of fluid and beverage ingredient.

In the present application the terms "internal", "back", "front", "top" "bottom", "lateral", "upper" and "lower" are used to describe the relational positioning of features of the invention. These terms should be understood to refer to the pack in its normal orientation when positioned in the module for the production of a beverage as shown in the figures . . . .

In the present application the term "flexible" means a material can be deformed or bent easily.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which:

FIGS. 7A-7C illustrate different packs can be used in the beverage production system of the invention.

DETAILED DESCRIPTION OF EXEMPLARY EMBODIMENTS

Figure 1:
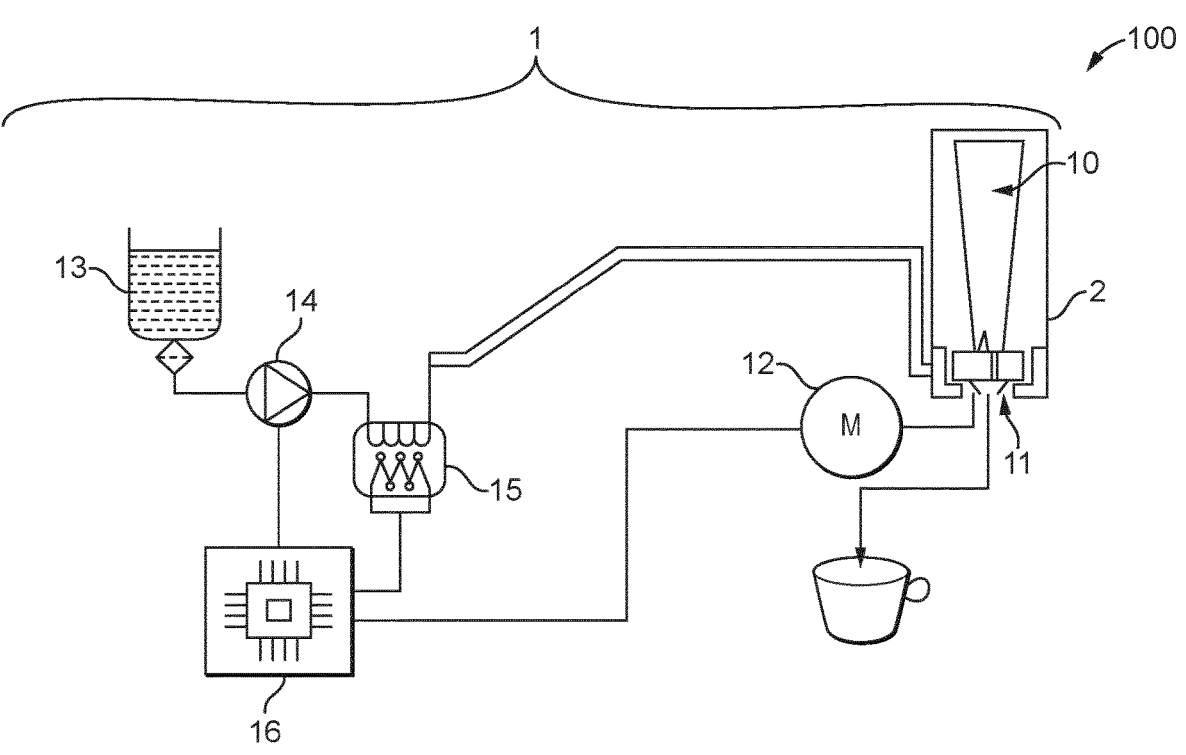
FIG. 1 is a schematic drawing of a beverage production system according to the invention.

FIG. 1 illustrates schematically a beverage production system 100 according to the invention.

The system 100 comprises a module 1 and a pack 10. The module is adapted for receiving the pack and producing a beverage from said pack.

The module 1 comprises a pack holder assembly 2 and a fluid system to introduce a fluid inside the pack.

The fluid system usually comprises a fluid source 13, like a water tank, pumping means 14 to pump the fluid from the source. Usually heating and/or cooling means are part of the system to adapt the temperature of the fluid to be introduced inside the pack.

The fluid is supplied to a fluid processing device 11 configured to cooperate with the bottom of the pack in order to introduce the fluid in said pack.

Generally, the module comprises am actuating device 12 move this fluid processing device 11 to said pack hold in the pack holder assembly 2.

The module comprises usually a system control unit 16 to control the above different devices for the preparation of a beverage from a pack.

Such a beverage production system 100 corresponds to the system described in the publications WO 2021/110650, WO 2021/110654 and/or WO 2021/110652.

Figure 2:
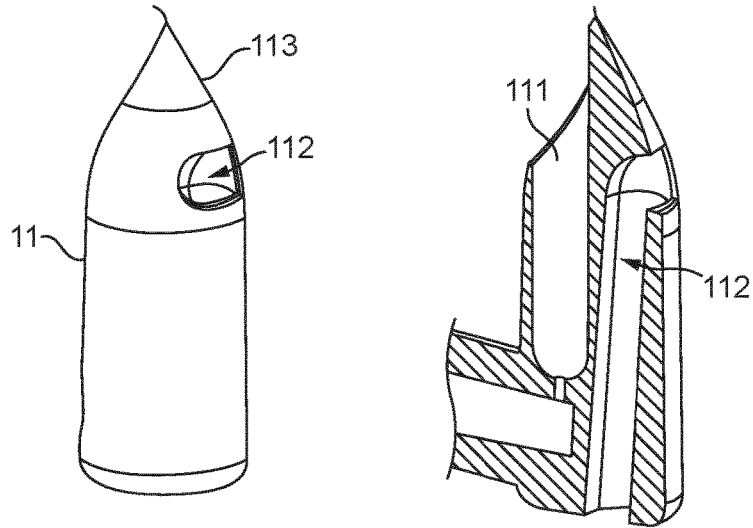
FIG. 2 is perspective view and a cross section view of a fluid processing device that can be used in the beverage production system.

FIG. 2 is perspective view and a cross section view of a fluid processing device 11 that can be used in the beverage production system. It comprises:

- a fluid inlet 111 for introducing a fluid into the openable area 104 of the pack hold in the chamber, and
- a beverage outlet 112 for dispensing the prepared beverage from said pack hold in the chamber.

The actuating device 12 is adapted to move this fluid processing device 11 to said pack hold in the chamber and in particular the pointed part 113 to the openable area 104 in order to open the openable area 104 or any membrane or cover provided at this area.

Other fluid processing device 11 such as described in WO 2021/110650 can be used in the system of the present invention.

Figure 3:
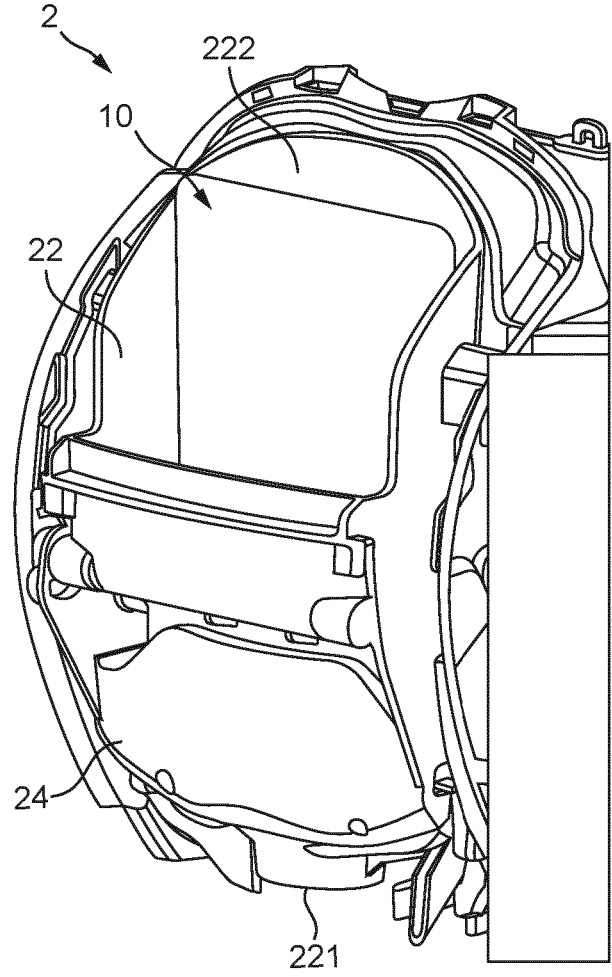
FIG. 3 is a view of the pack holder assembly of the module for producing a beverage.

FIG. 3 is a view of the pack holder assembly 2 of the module 1. The assembly comprises a pack chamber 22 presents a plane shape oriented along a plane (Pc), said plane of the chamber being oriented in an essentially vertical position the pack chamber: it is adapted for holding the pack 10 so that the plane (P) of the pack extends along said plane (Pc) of the chamber. The pack chamber comprises an upper pack inlet 222 to introduce a pack 10. The chamber presents a bottom opening 221 configured to enable access to at least the bottom side of the pack hold in the chamber.

The pack holder assembly 2 comprises a movable locking device 24 that is configured to fix the pack 10, in particular the bottom of the pack, inside the pack holder assembly when a beverage is prepared.

Figure 4A:
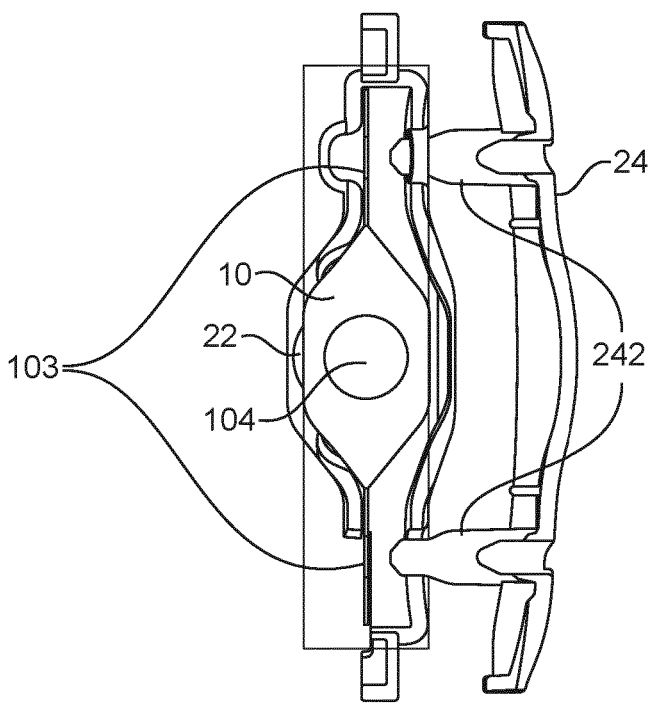
FIG. 4A, 4B are horizontal cross sectional view of the pack and the movable locking device in different relative positions.

FIG. 4A is a horizontal cross section view of the pack, the movable locking device and the bottom of the chamber where the looking device releases the pack.

The movable locking device 24 comprises two positioning means 242, in form of pins, each of said pins being positioned away from the pack 10. In this position, the operator is able to remove the pack form the pack holder or has just introduced a new one in the chamber.

Figure 4B:
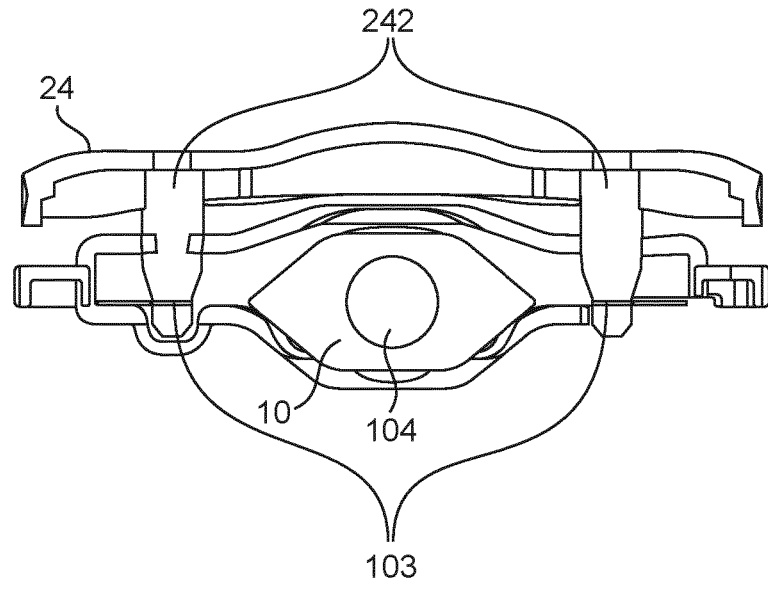

FIG. 4B is the corresponding horizontal cross section view where the looking device locks and positions the pack.

The locking device 24 is now positioned close to the chamber 22 and the pins 242 enters in the holes or deformable areas 103 of the pack present in the chamber. Preferably, the pins are positioned perpendicularly to the plane shape of the pack. These corresponding pins and holes enable a correct position of the pack inside the chamber which guarantees a correct interaction with the fluid processing device 11. They also maintain firmly the pack during the introduction of the fluid processing device 11 and they prevent the upwardly movement of the pack inside the chamber when a fluid squirts inside the pack.

This movable locking device can be moved between two positions by a dedicated actuating device of the module either automatically or manually.

Figure 5A:
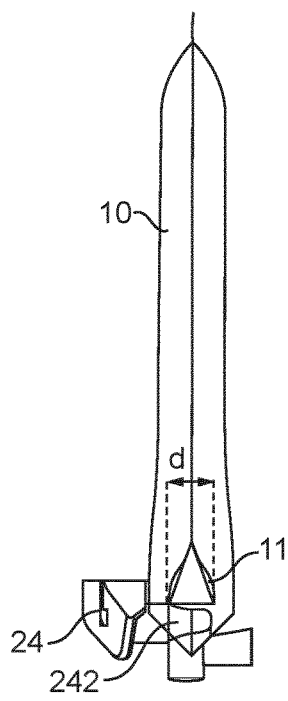
FIG. 5A is an isolated side view of the pack hold by the locking device and pierced the fluid processing device.

FIG. 5A is an isolated side view of the pack 10 hold by the locking device 24 and pierced the fluid processing device 11, said device protruding inside the internal volume of the pack in order to introduce the fluid. The device 11 has been previously introduced through the bottom side of the pack further to an upward vertical movement of the device, actuated by the actuating device (motor) of the module 1 (as schematically represented). The pins 242 of the locking device 24 retain the pack during that operation.

Figure 5B:
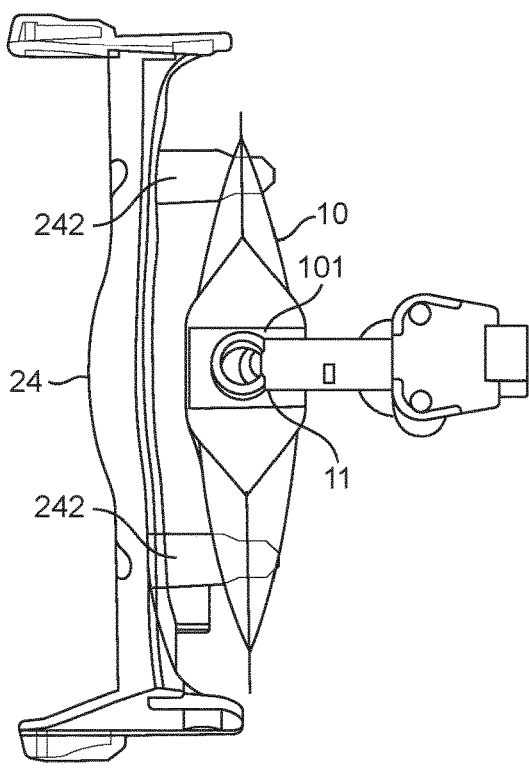
FIG. 5B is an isolated bottom view of the pack hold by the locking device and pierced the fluid processing device.
Figure 6:
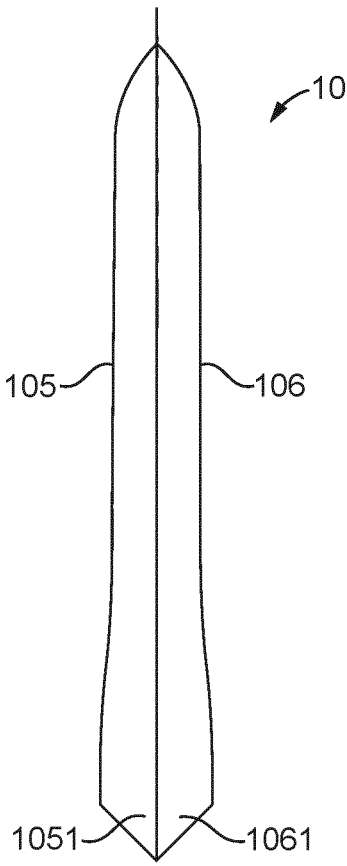
FIG. 6 is a side view of one embodiment of a pack

FIG. 5B is the corresponding bottom view of the pack hold by the locking device and pierced by the fluid processing device showing the penetration of the fluid processing device 11 inside the bottom side 101.

FIG. 7A is a perspective view of a pack 10 that can be used in the beverage production system 100 according to the invention.

This pack comprises an ingredient that is configured to be mixed with a fluid to produce a beverage. The pack presents a plane shape oriented along a plane P. Two longitudinal plane walls 105 (front and back) extends along this plane P.

In this specific embodiment, the walls 105 are made of a flexible material and the lateral edges 106 of these walls are sealed as well as the edges at the top end 107. The bottom side 101 of said pack is configured for being openable. The bottom side 101 comprises an area 104 that is an openable area and that is made of a flexible material. Usually, this area 104 is configured for being openable by the fluid processing device 11 of the system. This openable area 101 is adapted to enable the introduction of the fluid processing device 11 so that staid device protrudes inside the internal volume of the pack in order to introduce the fluid, as illustrated in FIG. 5A.

The pack comprises at least two holes 103 at the bottom end 108.

The bottom part 108 of the pack comprises two fixing means 103 which are holes. The holes are positioned around the openable area 104 of the bottom side of the pack. These holes are adapted to cooperate with the two positioning means 242 of the movable locking device such as illustrated in FIG. 4A, 4B, 5A or 5B. Precisely, the distance between the two holes correspond to the distance between the two pins 242 so that the locking device is able to move and position and fix the pack inside the chamber 22 during the opening of the openable area 104 by the fluid processing device 11 during its upwards movement and during the introduction of fluid in the pack from said device 10 protruding inside the internal volume of the pack.

In this illustrated embodiment the holes 103 are precisely positioned to be entered by the pins of the looking device. Preferably these holes are circular.

The pack 10 can comprises a readable code 102 in its bottom end 108 and the module 1 can comprises a code reader inside or close to the chamber 22.

FIG. 7B illustrates an alternative embodiment of the above pack wherein the holes 103 present different shapes and dimensions. In particular the surfaces of these holes are larger than the holes 103 defined in FIG. 7A.

FIG. 7C illustrates an alternative embodiment of the above packs wherein the bottom part 108 of the pack comprises two fixing means 103 which are deformable areas, in particular crossed slits traversing the sealed bottom edge of the pack. These slits are configured to be deformed when the two positioning means 242 of the movable locking device are pushed against it and then traversed by said positioning means. Consequently, the same locking sand positioning function is obtained. Similar effect s obtained with one slit only in place of two crossed slits.

In the different alternatives of the pack, it is preferred that the holes and/or the deformable areas encompasses specific circular fixing areas 1030, said circular fixing areas 1030 corresponding to two optimal fixing positions of the pack in the chamber for the beverage preparation.

In FIG. 7A, the two holes 103 correspond exactly to said circular fixing areas. In FIGS. 7B and 7C, the fixing means 103 encompasses these circular fixing areas 1030, which guarantees a proper positioning and fixing of the pack.

Preferably these fixing areas 103 are positioned at the same longitudinal height as the openable area 104 in the plane shape of the sachet.

Preferably, the distance D between the centres of said circular fixing areas shall not be too large to prevent the deformation of the flexible material which could be bent around the fluid processing device and create non desirable gap around said device at certain steps of the beverage preparation in particular during the step of fluid introduction. This distance is preferably of at most 52 mm, preferably at most 50 mm.

In the preferred illustrated embodiments of the pack of FIGS. 7A to 7C and 6, the edges 1051, 1061 of the bottom parts of said walls are sealed together around the openable area 104 of the bottom side and the circular fixing areas 1030 are provided in said sealed edges.

Preferably, the distance D between the centres of said circular fixing areas shall not be too small to prevent the possible separation of the sealed edges due to an inflation of the pack. This distance is preferably of at least 40 mm, preferably at least 42 mm, even more preferably at least 44 mm.

Preferably the distance (D) between the centres of the circular fixing areas 1030 is comprised between 40 and 52 mm, preferably between 43 and 50 mm, even more preferably between and 49 mm.

Preferable the pack presents a transversal dimension comprised between 65 and 75 mm.

In the preferred illustrated embodiments of the pack of FIGS. 7A to 7C, the openable area 104 of the pack can comprise a piece of reinforcing material 1040. This reinforcing material can define a flat surface around the flexible openable area 104 and facilitates the introduction of the fluid processing device 11 inside the pack.

Generally, said piece of reinforcing material comprises an opening, said opening being closed by a flexible material, defining the openable area 104.

Generally, it is preferred that the opening of the piece of reinforcing material and the cross section of the fluid processing device present circular shapes as illustrated in the figures. Preferably, the diameter of the opening in the reinforcing material is greater than the diameter (d) of the transversal section of the fluid processing device by about 1 mm, said transversal section of the fluid processing device corresponding to the section positioned in the opening of the piece of reinforcing material when the fluid processing device 11 protrudes inside the internal volume of the pack in order to introduce the fluid and as illustrated in FIG. 5A.

Figure 8:
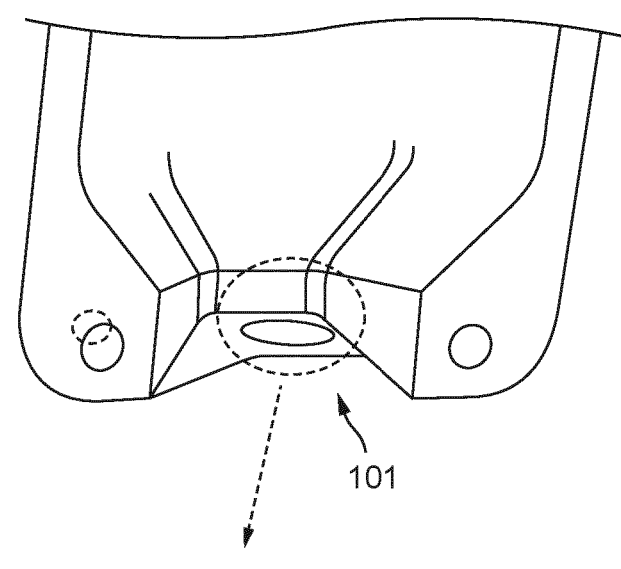
FIG. 8 is a schematic illustration of the materials of one preferred openable area.
Figure 8:
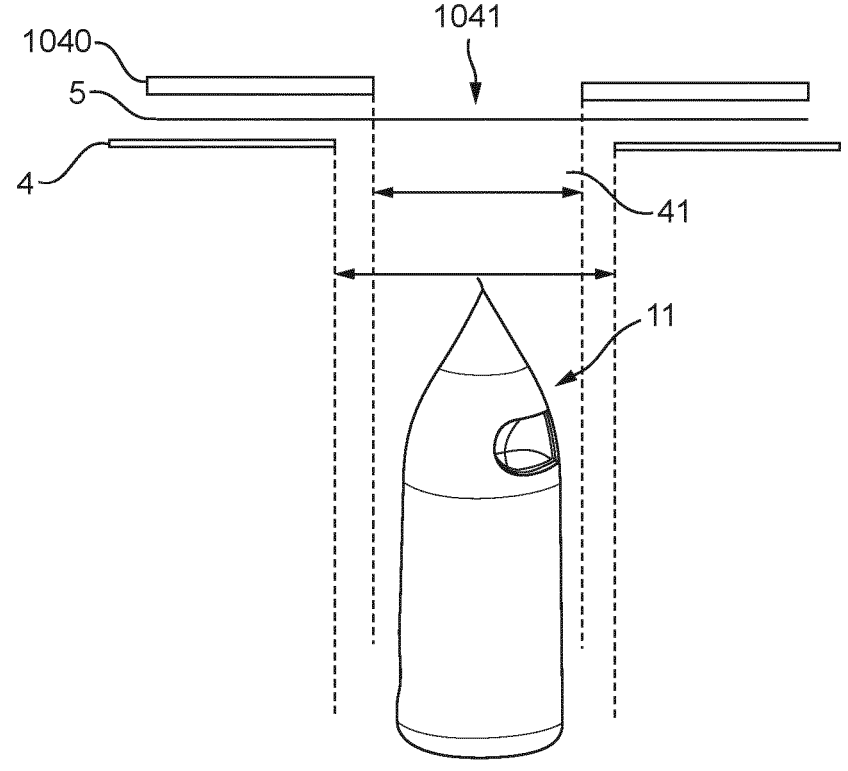

As illustrated in FIG. 8, in one preferred embodiment, the bottom side 101 of the pack comprises:

an external primary sheet 4 of flexible material, said primary sheet comprising a first opening 41 at the openable area, an intermediate secondary sheet 5 of flexible, preferably stretchable material, said secondary sheet covering the first opening, and an internal piece 1040 of reinforcing material, said piece comprising a second opening 1041, said second opening facing the first opening. The second and first openings are preferably aligned.

Preferably, the sizes of the first and second openings 41, 1041 are a bit greater than the size of the transversal section (d) of the fluid processing device. Accordingly, the fluid processing device is able to pierce the flexible or stretchable material 5 and to pass through the second opening 1041 while the pierced flexible or stretchable material covers a part of the fluid processing device 11. Preferably, when the shapes of the fluid processing device and the second opening 1041 are circular, the diameter of the second opening 1041 and the diameter d the transversal section of the fluid processing device can differ by about 1 mm.

Preferably the diameter of the first opening 41 and the diameter d the transversal section of the fluid processing device can differ by about 1 mm.

In particular, the above values (1 mm) apply for a diameter d of the transversal section of the fluid processing device comprised between 5 and 15 mm, preferably comprised between 5 and 12 mm, even more preferable comprised between 6 and 10 mm.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS system 100
module 1
   fluid processing device 11
   inlet means 111
   outlet means 112
   actuating device 12
   fluid source 13
   pumping means 14
   heating and/or cooling means 15
   system control unit 16
pack holder assembly 2
   pack chamber 22
      bottom opening 221
      pack inlet 222
   locking device 24
      positioning means 242
pack 10
bottom side 101
code 102
hole 103
openable area 104
piece of reinforcing material 1040 second opening 1041
front wall 105
    bottom edge 1051
back wall 106
    bottom edge 1061
reinforcing insert 107
opening 108
primary sheet 4
first opening 41
secondary sheet 5

The invention claimed is:

1. A beverage production system comprising a pack and a module for producing a beverage from the pack,
    said pack comprising a beverage ingredient, said ingredient being configured to be mixed with a fluid to produce a beverage, said pack comprising a bottom side and an upper end, said pack presenting a plane shape oriented along a plane extending between the bottom side and the upper end, said bottom side of said pack comprising an area configured to be openable, said openable area being made of a flexible material, and
    said module comprising:
    a pack holder assembly adapted for receiving and holding said pack, said pack holder assembly comprising a pack chamber adapted for receiving said pack through an upper pack inlet and for holding said pack inside the module, said chamber presenting a bottom opening configured to enable access to at least the bottom side of said pack held in the chamber;
    a fluid processing device comprising:
        at least one inlet for introducing a fluid into said pack for preparation of a beverage by mixing said fluid with the beverage ingredient contained in said pack, and
        at least one outlet for dispensing said beverage from said pack, said fluid processing device being designed to open the openable area of the pack; and
    an actuating device to move said fluid processing device and said pack towards one another so that the fluid processing device opens the bottom side of said pack, the actuating device being configured to position said fluid processing device and said pack in a fluid introduction position, wherein said fluid processing device protrudes inside an internal volume of the pack in order to introduce the fluid,
    wherein the pack holder assembly comprises a movable locking device, said movable locking device being configured to position the pack inside the pack chamber when a beverage is prepared,
    wherein the pack comprises a front wall and a back wall, said front and back walls being made of flexible material, at least edges of bottom parts of said front and back walls being sealed together at a bottom end of the pack,
    wherein the pack comprises at least two fixing means, said at least two fixing means being holes or deformable areas formed in the sealed edges of the front and back walls at the bottom end of the pack, said at least two fixing means being positioned around the openable area of the bottom side of the pack, and wherein the movable locking device comprises at least two positioning means, each of said positioning means being configured:
    to move inside one of the holes of the pack held in the chamber, or to move inside and deform one of the deformable areas of the pack held in the chamber and to fit in the resulting deformed area.

2. A beverage production system according to claim 1, wherein the openable area is made of a stretchable material.

3. A beverage production system according to claim 2, wherein the stretchable material is selected from the group consisting of: polyethylene (PE), polypropylene (PP), polylactide (PLA), polyhydroxyalcanoates (PHA), polybutylene adipate terepthalate (PBAT), polybutylene succinate (PBS), polyvinyl alcohol (PVOH), starch-based polymers, a polymer comprising food-grade oxygen and/or moisture scavengers, and a combination thereof.

4. A beverage production system according to claim 1, wherein the pack comprises two circular fixing areas, a distance between centers of said circular fixing areas being at most 52 mm, and
    wherein each of the holes or deformable areas of the pack encompasses one of said circular fixing areas.

5. A beverage production system according to claim 4, wherein the circular fixing areas are provided in said sealed edges, and
    wherein the distance between the centers of the circular fixing areas is at least 40 mm.

6. A beverage production system according to claim 1, wherein the openable area of the pack comprises a piece of reinforcing material and the sealed edges are disposed around said piece of reinforcing material.

7. A beverage production system according to claim 6, wherein said piece of reinforcing material comprises an opening, said opening being closed by the flexible material.

8. A beverage production system according to claim 7, wherein the opening of the piece of reinforcing material and a cross section of the fluid processing device present circular shapes, and
    a diameter of the opening of the piece of reinforcing material is greater than a diameter of the cross section of the fluid processing device by 1 mm, said cross section of the fluid processing device being positioned in the opening of the piece of reinforcing material when the fluid processing device protrudes inside the internal volume of the pack in order to introduce the fluid.

9. A beverage production system according to claim 1, wherein the bottom side of the pack comprises:
    an external primary sheet of flexible material, said primary sheet comprising a first opening at the openable area,
    an intermediate secondary sheet of flexible material, said secondary sheet covering the first opening, and
    an internal piece of reinforcing material, said internal piece comprising a second opening, said second opening facing the first opening.

10. A beverage production system according to claim 4, wherein the distance between the centers of the circular fixing areas is between 40 and 52 mm.

11. A beverage production system according to claim 1, wherein the pack presents a transversal dimension between 65 and 75 mm.

* * * * *